US008557005B2

(12) United States Patent
Goto et al.

(10) Patent No.: US 8,557,005 B2
(45) Date of Patent: Oct. 15, 2013

(54) POLYURETHANE FOAM AND POLISHING PAD

(75) Inventors: Michiro Goto, Osaka (JP); Kazuo Takemoto, Osaka (JP); Nobuyuki Ooshima, Kyoto (JP); Shin-ichi Haba, Kyoto (JP); Kouichi Yoshida, Kyoto (JP); Norio Kawai, Kyoto (JP)

(73) Assignees: Toyo Polymer Co., Ltd., Osaka (JP); Nitta Haas Incorporated, Osaka (JP)

( * ) Notice: Subject to any disclaimer, the term of this patent is extended or adjusted under 35 U.S.C. 154(b) by 0 days.

(21) Appl. No.: 12/989,241

(22) PCT Filed: Apr. 21, 2009

(86) PCT No.: PCT/JP2009/057886
§ 371 (c)(1),
(2), (4) Date: Oct. 22, 2010

(87) PCT Pub. No.: WO2009/131106
PCT Pub. Date: Oct. 29, 2009

(65) Prior Publication Data
US 2011/0039966 A1    Feb. 17, 2011

(30) Foreign Application Priority Data

Apr. 25, 2008    (JP) .................................. 2008-116025

(51) Int. Cl.
*B24B 1/00*    (2006.01)
*B24D 11/02*    (2006.01)
*C08G 18/00*    (2006.01)

(52) U.S. Cl.
USPC ............. 51/296; 521/155; 521/170; 521/172; 521/174

(58) Field of Classification Search
USPC ...................... 521/155, 170, 172, 174; 51/296
See application file for complete search history.

(56) References Cited

U.S. PATENT DOCUMENTS

| 6,284,812 | B1* | 9/2001 | Rotermund et al. | .......... 521/174 |
| 6,953,388 | B2* | 10/2005 | Shimagaki et al. | ............ 451/41 |
| 2004/0021243 | A1* | 2/2004 | Shih et al. | ...................... 264/51 |
| 2010/0029182 | A1 | 2/2010 | Fukuda et al. | |

FOREIGN PATENT DOCUMENTS

| JP | 06-228266 | 8/1994 |
| JP | 2000-178374 | 6/2000 |

(Continued)

OTHER PUBLICATIONS

Written Opinion of the International Searching Authority referring to International Application No. PCT/JP2009/057886 dated Jul. 14, 2009, 4 pages.
Written Opinon of the International Preliminary Examining Authority referring to International Application No. PCT/JP2009/057886 dated Mar. 23, 2010, 4 pages.
International Preliminary Report on Patentability referring to International Application No. PCT/JP2009/057886, 6 pages.

(Continued)

*Primary Examiner* — Melissa Rioja
(74) *Attorney, Agent, or Firm* — Vedder Price P.C.

(57) ABSTRACT

The present invention provides a polyurethane foam, which, despite having a low specific gravity, has a hardness and an elasticity favorable for a polishing pad, and a polishing pad made using the polyurethane foam. The polyurethane foam is obtained by reacting a blend composition containing (A) a polyisocyanate, (B) a polyol, (C) a chain extender with a molecular weight of equal to or smaller than 400, and (D) water, and in the blend composition, MDI is blended as a main component of the component (A) and a blending amount of the MDI is 45 to 70 parts by weight when a total weight of the respective components (A), (B), and (C) is taken as 100 parts by weight.

3 Claims, 1 Drawing Sheet

(56) References Cited

FOREIGN PATENT DOCUMENTS

| | | |
|---|---|---|
| JP | 2004-202206 | 7/2004 |
| JP | 2004-317882 | 11/2004 |
| JP | 3685064 | 8/2005 |
| JP | 2007-91898 | 4/2007 |
| JP | 2007-326984 | 12/2007 |
| JP | 2008-68334 | 3/2008 |
| JP | 2008-87148 | 4/2008 |
| JP | 2008-290244 | 4/2008 |
| JP | 2010-280743 | 12/2010 |
| TW | 200402437 A | 2/2004 |
| TW | 200621822 | 7/2006 |
| WO | WO2008/029538 | 3/2008 |

OTHER PUBLICATIONS

Japanese Office Action received for Japanese Application No. 2010-509178 and its English translation.
First Office Action issued in connection with Chinese Patent Application 200980114547.1, issued Apr. 5, 2012 and its English translation.
The Chinese Book: Polyurethane Foam Plastics, p. 291 and its English translation, Aug. 2004.
Notice of Rejection dated Jul. 12, 2011, that has been issued in connection with related Japanese Patent Application 2010-509178.
Notification of the Opinion on Examination in corresponding Taiwanese Application No. 981113653.

* cited by examiner

FIGURE 1
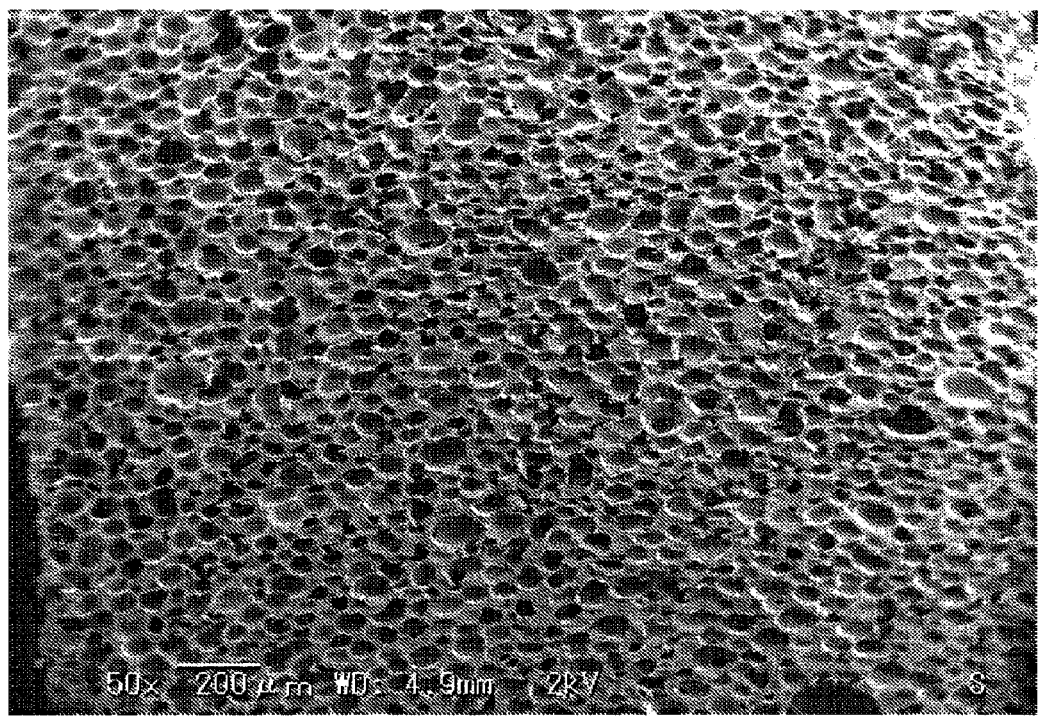
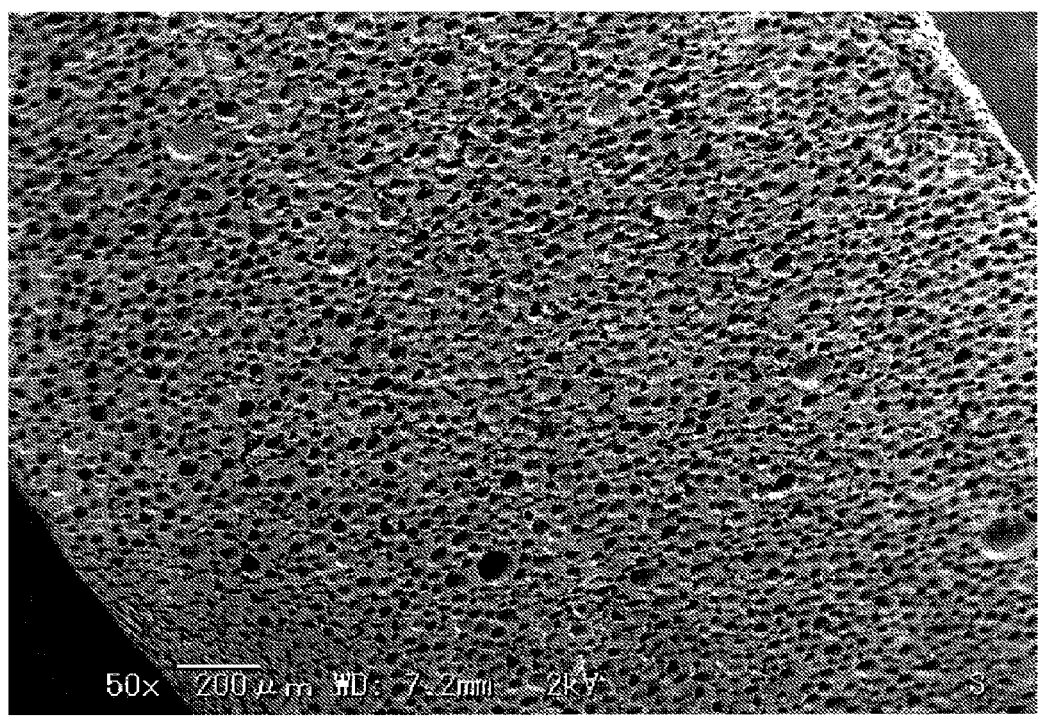
FIGURE 2

POLYURETHANE FOAM AND POLISHING PAD

BACKGROUND OF THE INVENTION

1. Field of the Invention

The present invention relates to a polyurethane foam and a polishing pad using the same.

2. Description of the Related Art

With a semiconductor substrate, such as a silicon wafer, an optical member, such as a lens, or an electronic material, such as a magnetic head, hard disk, a high precision is required of the product, and polishing and smoothening of a surface are essential in the manufacturing process. An apparatus for performing the polishing is generally arranged from a polishing head that holds a polishing object, a polishing pad for performing a polishing process on the polishing object, and a polishing platen for holding the polishing pad. Then, while using a polishing slurry made of a polishing agent and a chemical, the polishing object and the polishing pad are made to undergo relative movement to remove projections and uneven portions on the polishing object surface and thereby smoothen the polishing object. The polishing pad used in this process is required to have a high hardness and a high elasticity as characteristics for preventing generation of defects in the product.

A polyurethane foam, which, in order to meet the above required characteristics, uses a urethane composition prepared by blending a prepolymer, obtained by reacting tolylene diisocyanate (TDI) as a polyisocyanate and polytetramethylene ether glycol (PTMG) as a polyol, with 3,3'-dichloro-4,4'-diaminodiphenylmethane (MOCA) as a curing agent, foamed particles, air, water, etc., and is manufactured by making the urethane composition foam and chain-extending the prepolymer, and a polishing pad using the foam have been disclosed from before (see Patent Documents 1 and 2).

Patent Document 1: Japanese Published Unexamined Patent Application No. 2000-178374
Patent Document 2: Patent Publication No. 3685064

SUMMARY OF THE INVENTION

Although high hardness and high elasticity are normally required as quality characteristics of a polishing pad, the required quality characteristics are becoming more advanced recently, such as a hardness of the conventional level being required even with a low specific gravity (for example, of equal to or smaller than 0.6). However, such quality characteristics cannot be realized with a conventional polishing pad. In addition to the above, a high abrasion resistance is also required as a quality characteristic of a polishing pad.

Thus, a main object of the present invention is to provide a polyurethane foam, which, despite having a low specific gravity, has a hardness and an elasticity favorable for a polishing pad, and a polishing pad made using the polyurethane foam. In addition to the above object, an object of the present invention is to provide a polyurethane foam, having an abrasion resistance equivalent to that of a conventional, MOCA-based polyurethane foam, and a polishing pad made using the polyurethane foam.

The present inventors found that the above object can be achieved by using diphenylmethane diisocyanate (MDI) as the polyisocyanate, a specific polypropylene glycol as a polyol, and setting a content of the MDI in a blend composition, which uses a chain extender and water in addition to the above, within a specific range, and examined various polyols that could be used and have thereby come to complete the present invention.

That is, the gist of the present invention is as follows.

[1] A polyurethane foam obtained by reacting a blend composition containing (A) a polyisocyanate, (B) a polyol, (C) a polyvalent alcohol-based chain extender with a molecular weight of equal to or smaller than 400, and (D) water, and with which in the blend composition, diphenylmethane diisocyanate (MDI) is blended as a main component of the component (A) and a blending amount of the MDI is 45 to 70 parts by weight when a total weight of the respective components (A), (B), and (C) is taken as 100 parts by weight.

[2] The polyurethane foam according to [1] where at least one type of polyol selected from the group consisting of polyester polyols, polycarbonate polyols, and polytetramethylene ether glycols with a number average molecular weight of equal to or greater than 1500 and an average number of functional groups of equal to or greater than 2 is blended as a main component of the component (B).

[3] The polyurethane foam according to [1] where a polypropylene glycol having a number average molecular weight of equal to or greater than 2500, having an average number of functional groups of equal to or greater than 3, and having ethylene oxide added to a terminal, is blended as a main component of the component (B).

[4] The polyurethane foam according to any of [1] to [3] where at least one type of chain extender selected from the group consisting of diethylene glycol, ethylene glycol, and 1,3-propanediol is contained as the component (C).

[5] A method for manufacturing the polyurethane foam according to any of [1] to [4] where, in reacting the blend composition inside a closed mold, 10 to 80 parts by weight of the blend composition are injected per 100 parts by volume of the closed mold.

[6] A polishing pad made of the polyurethane foam according to any of [1] to [4].

By the invention described in [1] or [2], a polyurethane foam, which, despite being of low specific gravity, has a hardness and a elasticity favorable for a polishing pad, can be provided.

By the invention described in [3], a polyurethane foam, which, in addition to providing the effects of the invention described in [1] or [2], has an abrasion resistance equivalent to a conventional MOCA-based polyurethane foam, can be provided.

By the invention described in [4], a polyurethane foam, which, in addition to providing the effects of the invention described in any of [1] to [3], is made finer in average pore diameter, can be provided.

By the invention described in [5], a polyurethane foam with a specific gravity in a range of 0.1 to 0.8 can be manufactured readily, simply by varying an amount of injection of the blend composition into the closed mold.

By the invention described in [6], a polishing pad having the effects of [1] to [4] can be provided.

BRIEF DESCRIPTION OF THE DRAWINGS

FIG. 1 is a scanning electron micrograph of a polyurethane foam sheet obtained in Example 3; and
FIG. 2 is a scanning electron micrograph of a polyurethane foam sheet obtained in Example 18.

DETAILED DESCRIPTION OF THE PREFERRED EMBODIMENTS

As described above, a polyurethane foam according to the present invention can be obtained by reacting a blend composition containing (A) a polyisocyanate, (B) a polyol, (C) a polyvalent alcohol-based chain extender with a molecular weight of equal to or smaller than 400, and (D) water, and in the blend composition, diphenylmethane diisocyanate (MDI) is blended as a main component of the component (A) and a blending amount of the MDI is 45 to 70 parts by weight when a total weight of the respective components (A), (B), and (C) is taken as 100 parts by weight.

In the present invention, the polyurethane foam may be manufactured by either a one-shot method or a prepolymer method, in which an isocyanate-terminated urethane prepolymer, made of the component (A) and the component (B) (and where necessary, a small amount of the component (C)), is synthesized and then made to react with the component (C) (the remaining component (C) in the case where the component (C) is used in the synthesis of the prepolymer), the component (D), etc., and in a case where a below-described polypropylene glycol, having a number average molecular weight of equal to or greater than 2500, having an average number of functional groups of equal to or greater than 3, and not having ethylene oxide added to a terminal, is used as a main component of the component (B), it is preferable to perform manufacture by the prepolymer method to make the polyurethane foam exhibit a hardness and an elasticity that are favorable for a polishing pad. A specific method for manufacturing the polyurethane foam shall be described below.

As (A) the polyisocyanate that is the raw material component of the present invention, MDI is preferable in being low in vapor pressure and low in toxicity. As examples of such an MDI, diphenylmethanediisocyanate (pure MDI), polymethylene polyphenylene polyisocyanate (polymeric MDI), and modified products of the above can be cited, and each of these may be used solitarily or two or more types may be used in combination. As examples of the modified products, urethane-modified products, carbodiimide-modified products, allophanate-modified products, urea-modified products, biuret-modified products, isocyanurate-modified products, oxazolidone-modified products, etc., can be cited. Among these, a carbodiimide-modified product (hereinafter, referred to as "carbodiimide-modified MDI") can be used favorably due to being a liquid at room temperature, low in viscosity, and easy to handle.

Commercial products of such MDIs can be acquired readily, and Cosmonate PH (made by Mitsui Chemicals Urethanes Inc.), Millionate MT (made by Nippon Polyurethane Industry Co., Ltd.), etc., can be cited as examples of pure MDIs, Cosmonate M-100, Cosmonate M-200 (both made by Mitsui Chemicals Urethanes Inc.), Millionate MR100, Millionate MR200 (both made by Nippon Polyurethane Industry Co., Ltd.), etc., can be cited as examples of polymeric MDIs, and Cosmonate LL (made by Mitsui Chemicals Urethanes Inc.), Millionate MTL (made by Nippon Polyurethane Industry Co., Ltd.), SBU0632 (made by Sumika Bayer Urethane Co., Ltd.) etc., can be cited as examples of carbodiimide-modified MDIs.

In the present invention, although the MDI is used as the main component in the component (A), another polyisocyanate, such as an aliphatic diisocyanate, alicyclic diisocyanate, aromatic diisocyanate, araliphatic diisocyanate, may also be used in combination. As examples of aliphatic diisocyanates, hexamethylene diisocyanate (HDI, made by Nippon Polyurethane Industry Co., Ltd.), 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, etc., can be cited. As examples of alicyclic diisocyanates, isophorone diisocyanate (Desmodule I, made by Sumika Bayer Urethane Co., Ltd.), hydrogenated xylylene diisocyanate (Takenate 600, made by Mitsui Chemicals Urethanes Inc.), 4,4'-dicyclohexylmethane diisocyanate (Desmodule W, made by Sumika Bayer Urethane Co., Ltd.), 1,4-cyclohexane diisocyanate, methylcyclohexylene diisocyanate, 1,3-bis(isocyanatomethyl)cyclohexane, etc., can be cited. As examples of aromatic diisocyanates, tolylene diisocyanate (Coronate T-100, -80, and -65, made by Nippon Polyurethane Industry Co., Ltd.), 1,5-naphthalene diisocyanate (Cosmonate ND, made by Mitsui Chemicals Urethanes Inc.), xylylene diisocyanate (Takenate 500, made by Mitsui Chemicals Urethanes Inc.), 1,3-phenylene diisocyanate, 1,4-phenylene diisocyanate, etc., can be cited. As examples of araliphatic diisocyanates, dialkyldiphenylmethane diisocyanates, tetraalkyldiphenylmethane diisocyanates, $\alpha,\alpha,\alpha,\alpha$-tetramethylxylylene diisocyanate, etc., can be cited.

In regard to (B) the polyol that is the raw material component of the present invention, it is preferable to blend a polyester polyol, a polycarbonate polyol, or a polytetramethylene ether glycol having a number average molecular weight of equal to or greater than 1500 and an average number of functional groups of equal to or greater than 2 as the main component of the component (B) in that, in the combination with the component (A), the manufactured polyurethane foam exhibits a hardness and elasticity favorable for a polishing pad.

A polyester polyol is obtained by dehydration condensation of a glycol or an ether given below and a divalent carboxylic acid or a carboxylic anhydride, etc. Specific compounds used to prepare a polyester polyol that is useable in the present invention shall now be cited. As examples of saturated or unsaturated glycols, various glycols, such as ethylene glycol, diethylene glycol, triethylene glycol, 1,2-propanediol, 1,3-propanediol, 1,3-butanediol, 1,4-butanediol, neopentyl glycol, pentanediol, 3-methyl-1,5-pentanediol, 1,6-hexanediol, octanediol, 1,4-butynediol, dipropylene glycol, can be cited. As examples of ethers, alkyl glycidyl ethers, such as n-butyl glycidyl ether, 2-ethylhexyl glycidyl ether, and monocarboxylic acid glycidyl esters, such as versatic acid glycidyl ester, can be cited. As examples of divalent carboxylic acids and acid anhydrides, dibasic acids, such as adipic acid, maleic acid, fumaric acid, phthalic anhydride, isophthalic acid, terephthalic acid, succinic acid, oxalic acid, malonic acid, glutaric acid, pimelic acid, azelaic acid, sebacic acid, suberic acid, acid anhydrides corresponding to the above, dimer acids, castor oil and an aliphatic acid thereof, etc., can be cited. Besides polyester polyols obtained by performing dehydration condensation using the above, polyester polyols obtained by ring-opening polymerization of a cyclic ester compound can also be cited.

The polyester polyol useable in the present invention can be acquired readily as a commercial product, and poly[3-methyl-1,5-pentanediol]-alt-(adipic acid)] (Kuraray Polyol P2010, made by Kuraray Co., Ltd.), made by dehydration condensation of 3-methyl-1,5-pentanediol and adipic acid, can be cited as an example.

A polycarbonate polyol is generally produced via a reaction, such as a demethanolization condensation reaction of a polyvalent alcohol and dimethyl carbonate, a dephenolization condensation reaction of a polyvalent alcohol and diphenyl carbonate, a deethyleneglycolization condensation reaction of a polyvalent alcohol and ethylene carbonate. As examples of the polyvalent alcohol used in these reactions various saturated and unsaturated glycols, such as 1,6-hexanediol, diethylene glycol, triethylene glycol, propylene glycol, 1,3-butanediol, 1,4-butanediol, neopentyl glycol, pentanediol, 3-methyl-1,5-pentanediol, octanediol, 1,4-butynediol, dipropylene glycol, tripropylene glycol, polytetramethylene ether glycol, and alicyclic glycols, such as 1,4-cyclohexane diglycol, 1,4-cyclohexane dimethanol, can be cited.

The polycarbonate polyol useable in the present invention can be acquired readily as a commercial product, and a copolymer (PES-EXP815, made by Nippon Polyurethane Industry Co., Ltd.), having 1,6-hexanediol as a main component, can be cited as an example.

As examples of the polytetramethylene ether glycol, those obtained by adding tetrahydrofuran by a ring-opening polymerization to one type or two or more types of polyvalent alcohol, such as ethylene glycol, diethylene glycol, propylene glycol, dipropylene glycol, glycerin, trimethylolpropane, neopentyl glycol, can be cited. Each of these cyclic ethers may be used solitarily or two or more types may be used in combination. A copolymer using two or more types of the cyclic ethers may also be used. A copolymer of tetrahydrofuran and neopentyl glycol (PTXG-1800, made by Asahi Kasei Corp.) can be cited as an example.

Also, in regard to (B) the polyol that is the raw material component of the present invention, it is preferable to blend a polypropylene glycol having a number average molecular weight of equal to or greater than 2500 and preferably equal to or greater than 3000, having an average number of functional groups of equal to or greater than 3, and having ethylene oxide added to a terminal (hereinafter, such a specific polypropylene glycol may be referred to at times as "EO-added PPG") as the main component of the component (B) in that, in the combination with the component (A), the manufactured polyurethane foam exhibits a hardness and an elasticity favorable for a polishing pad and exhibits an abrasion resistance equivalent to that of a conventional MOCA-based polyurethane foam. The ethylene oxide content is preferably 5 to 30 weight % and more preferably 5 to 25 weight % in the polyol. Such a specific (B) polyol can be acquired readily as a commercial product, and Actocol EP-3033 (made by Mitsui Chemicals Urethanes Inc.), PREMINOL 7003 (made by Asahi Glass Co., Ltd.), PREMINOL 7001 (made by Asahi Glass Co., Ltd.), and Adeka Polyether AM302 (made by Adeka Corp.), etc., can be cited as examples.

Also, in regard to (B) the polyol that is the raw material component of the present invention, it is preferable to blend a polypropylene glycol having a number average molecular weight of equal to or greater than 2500, having an average number of functional groups of equal to or greater than 3, and not having ethylene oxide added to a terminal (hereinafter, such a specific polypropylene glycol may be referred to at times as "non-EO-added PPG") as the main component of the component (B) in that, in the combination with the component (A), the manufactured polyurethane foam exhibits a hardness and elasticity favorable for a polishing pad. Such a specific (B) polyol can be acquired readily as a commercial product, and Adeka Polyether G3000 (made by Adeka Corp.), etc., can be cited as an example.

As described above, the compound that can be used as the main component of the component (B) in the present invention is selected from the group consisting of: at least one type of polyol among polyester polyols, polycarbonate polyols, and polytetramethylene ether glycols with a number average molecular weight of equal to or greater than 1500 and an average number of functional groups of equal to or greater than 2; EO-added PPGs; and non-EO-added PPGs; and among these, EO-added PPGs and non-EO-added PPGs are preferable in terms of hydrolysis resistance, price, etc. Also, between EO-added PPGs and non-EO-added PPGs, EO-added PPGs are preferable in that the one-shot method can be applied in the process of manufacturing the polyurethane foam as shall be described later.

In the present Specification, a "hardness favorable for a polishing pad" refers to an A scale hardness value of equal to or greater than 80° A when a polyurethane foam sheet, prepared by slicing a manufactured polyurethane foam to a thickness of 1.5 mm, is measured as a test piece by a hardness tester. With the hardness being set thus, a surface of a polishing object can be made smoother readily in a polishing process. An "elasticity favorable for a polishing pad" refers to a state where, when a polyurethane foam sheet, prepared by slicing a manufactured polyurethane foam to a thickness of 1.5 mm, is used as a test piece and the test piece is folded in two, cracks do not form at the bent portion (this test shall hereinafter be referred to as the "180° flex test"). Further, an "abrasion resistance equivalent to that of the conventional, MOCA-based polyurethane foam" refers to a state where an abrasion amount determined by performing an abrasion test using a polyurethane foam sheet, prepared by slicing a manufactured polyurethane foam to a thickness of 1.5 mm, as a test piece in compliance to JIS K 7204 is equivalent to the abrasion amount obtained with the conventional, MOCA-based polyurethane foam. By having such abrasion resistance, the polishing pad can be made approximately equivalent in life to the conventional product.

(C) The chain extender that is the raw material component of the present invention is a polyvalent alcohol with a molecular weight of equal to or smaller than 400. As examples of such a chain extender, straight-chain aliphatic glycols, such as ethylene glycol, propylene glycol, 1,3-propanediol, 1,3-butanediol, 1,4-butanediol, 1,5-pentanediol, 3-methyl-1,5-pentanediol, 1,6-hexanediol, diethyleneglycol, triethylene glycol, tetraethylene glycol, dipropylene glycol, tripropylene glycol, polyethylene glycol, 1,8-octanediol, 1,9-nonanediol; aliphatic branched glycols, such as neopentyl glycol, 3-methyl-1,5-pentanediol, 2-methyl-1,3-propanediol, 2-butyl-2-ethyl-1,3-propanediol, 2-methyl-1,8-octanediol; alicyclic glycols, such as 1,4-cyclohexanediol, 1,4-cyclohexanedimethanol, hydrogenated bisphenol A, and polyfunctional glycols, such as glycerin, trimethylolpropane, tributylolpropane, pentaerythritol, sorbitol, can be cited, each of these can be used solitarily or two or more types may be used in combination, and further, two or more types may be used as a copolymer. Among the above, ethylene glycol, diethylene glycol, and 1,3-propanediol are favorable in that an average pore diameter of the manufactured polyurethane foam is made more minute and more favorable characteristics for a polishing pad are exhibited.

In the present Specification, an "average pore diameter" refers to an average value of pore diameters of all pores present in a photograph of a cross-section of a test piece, which is a polyurethane foam sheet prepared by slicing the manufactured polyurethane foam to a thickness of 1.5 mm, observed at a magnification of 200 times by a scanning electron microscope and analyzed by an image processing apparatus. In using the polyurethane foam as a polishing pad, the average pore diameter is preferably equal to or smaller than 100 μm and more preferably equal to or smaller than 90 μm. With such an average pore diameter, excessive polishing (so-called rounding or edge roll-off phenomenon) of an end portion of a polishing object caused by pore edge portions in a polishing process can be suppressed, and consequently an area of a flat portion of the polishing object surface can be increased to enable improvement of yield of a device chip, etc., in the polishing object.

The polyurethane foam according to the present invention is manufactured by reacting the blend composition containing (A) the polyisocyanate, (B) the polyol, (C) the chain extender, and (D) water as a foaming agent.

A blending proportion of (A) the polyisocyanate is preferably set in the range of 45 to 70 parts by weight when the total weight of the respective components (A), (B), and (C) is taken as 100 parts by weight in that the manufactured polyurethane foam exhibits the hardness and the elasticity favorable for a polishing pad.

Also, the blending proportion of (B) the polyol is preferably set in a range of 10 to 50 parts by weight when the total weight of the respective components (A), (B), and (C) is taken as 100 parts by weight. When the component (B) is blended in the above range, in the combination with the component (A), the manufactured polyurethane foam exhibits the hardness and the elasticity favorable for a polishing pad. The blending proportion of (D) water is preferably set in a range of 0.01 to 0.5 parts by weight when the total weight of the respective components (A), (B), and (C) is taken as 100 parts by weight.

An isocyanate group/hydroxyl group equivalence ratio (NCO group/OH group) is preferably 0.8 to 1.2 and more preferably 0.9 to 1.1.

In addition to the components (A) to (D), the blend composition may contain additives known in the field of art of polyurethane foams, such as a catalyst, foam stabilizer, antioxidant, anti-aging agent, filler, plasticizer, colorant, antifungal agent, antibacterial agent, flame retardant, ultraviolet absorber. However, it is preferable not to blend MOCA, which is generally used as a curing agent.

As the catalyst, for example, tin octanate, tin naphthenate, dibutyltin dilaurate, zinc octanate or other metal catalyst (also referred to as a "resinification catalyst") made of an organic acid and Sn, Co, Ni, Fe, Zn, Pb, etc., or an amine catalyst (also referred to as a foaming catalyst), such as triethylamine, dimethylcyclohexylamine, 1,4-diazabicyclo[2.2.2]octane, 1,5-diazabicyclo[4.3.0]nona-5-ene, 1,8-diazabicyclo[5.4.0]undeca-7-ene, diethylbenzylamine, may be used in combination. As a metal catalyst, for example, "Adeka Stab 465E" (made by Adeka Corp.) may be used, and as an amine catalyst, for example, DABCO 33LV (made by Air Products Japan Inc.) may be used. As a foam stabilizer, a silicone foam stabilizer known in the field of art of polyurethane foams, such as any of various polyether-modified silicones, may be used, and for example, SH193 (made by Dow Corning Toray Co., Ltd.) may be used.

A method for manufacturing the polyurethane foam shall now be described. As examples of the one-shot method, (1) a method of foaming the blend composition, obtained by placing (A) the polyisocyanate, (B) the polyol, (C) the chain extender, (D) water, and the additives as necessary in a closed mold and mixing by a mixer, etc.; (2) a method of mixing a mixed liquid, in which (B) the polyol, (C) the chain extender, (D) water, and the additives as necessary are mixed (hereinafter, a mixed liquid containing the component (B) shall be referred to as the "R liquid"), with (A) the polyisocyanate (hereinafter, a liquid made up of the component (A) shall be referred to as the "P liquid") by a mixer etc., and then injecting the blend composition thus obtained in a closed mold and foaming the blend composition; (3) a method of mixing the R liquid and the P liquid by an RIM (reaction injection molding) machine and then injecting the blend composition thus obtained into a closed mold and obtaining the foamed polyurethane; etc., can be cited. As an example of a normal arrangement of an RIM machine, that which includes respective mechanisms of temperature-adjustable raw material tanks (two tanks for the R liquid and the P liquid), measuring pumps (two for the R liquid and the P liquid), a mixing head, a hydraulic unit for the mixing head, etc., can be cited.

In the present invention, the one-shot method is applied in a case where, of the components (B) mentioned above, the at least one type of polyol among polyester polyols, polycarbonate polyols, and polytetramethylene ether glycols with a number average molecular weight of equal to or greater than 1500 and an average number of functional groups of equal to or greater than 2 or the EO-added PPG is blended as the main component of the component (B).

As examples of the prepolymer method, (1) a method of reacting (A) the polyisocyanate and (B) the polyol (and where necessary, a small amount of (C) the chain extender) to synthesize an isocyanate-terminated urethane prepolymer (the prepolymer obtained shall be referred to hereinafter as the "X liquid"), separately preparing a blend composition obtained by placing and mixing (C) the chain extender (the remainder of (C) the chain extender in the case where (C) the chain extender was used in the synthesis of the prepolymer), (D) water, and the above additives as necessary in a mixer, etc. (the mixed liquid thus obtained shall be referred to hereinafter as the "Y liquid"), then mixing the X liquid and the Y liquid in a mixer, etc., and injecting the blend composition thus obtained into a closed mold to obtain a foamed polyurethane; (2) a method of mixing the X liquid and the Y liquid by a RIM machine and injecting the blend composition thus obtained into a closed mold to obtain a foamed polyurethane; etc., can be cited. In the present invention, the prepolymer method is applied in a case where any of the components (B) mentioned above is used as the main component of the component (B).

Regardless of which of the above manufacturing methods is adopted, a specific gravity of the manufactured polyurethane foam can be readily adjusted simply by changing an injection amount of the blend composition injected into the closed mold. That is, the specific gravity of the manufactured polyurethane foam is a value that substantially corresponds to a ratio of the weight of the injected blend composition with respect to a volume (100 parts by volume) of the closed mold. For example, when 10 to 80 parts by weight, 15 to 80 parts by weight, or 20 to 80 parts by weight of the blend composition is injected per 100 parts by volume of the closed mold, the specific gravity of the manufactured polyurethane foam can be adjusted to be within the range of 0.1 to 0.8, 0.15 to 0.8, or 0.2 to 0.8, respectively.

When, of the abovementioned manufacturing methods, the RIM machine of (3) is adopted, the average pore diameter of the manufactured polyurethane foam is made more minute and favorable for a polishing pad in comparison to cases of adopting the methods of (1) and (2) above.

The closed mold is not restricted in particular in regard to shape, material, etc., as long as there is no leakage of the injected raw material and the mold can withstand a pressure during foam curing of the raw material.

The polyurethane foam manufactured as described above has a specific gravity in a range of 0.1 to 0.8, an A scale hardness of equal to or greater than 80° A, an average pore diameter of generally equal to or smaller than 100 μm, an elasticity such that cracks do not form at a bent portion in a 180° flex test, and an abrasion resistance equivalent to that of the conventional MOCA-based polyurethane foam and is thus favorable as a polishing pad.

Besides a polishing pad, the polyurethane foam having the above characteristics is also applicable, for example, to shock absorbers (artificial sleepers, vibration-proofing materials, shock absorbers for automobiles, etc.), yarn feeding roll materials for spinning, lining materials (for steel pipes, for screens meshes, etc.), industrial rolls (rolls for office automation equipment, caster wheels, rolls for various construction materials, etc.), etc.

EXAMPLES

Although the present invention shall now be described in further detail below by way of examples, the present invention is not limited to these examples. In the following description, "parts" and "%" shall refer respectively to "parts by weight" and "weight %" unless noted in particular otherwise.

1. Examination of Favorable Blending Amount of MDI

Examples 1 to 5 and Comparative Examples 1 to 3

Raw Materials

The raw materials used for manufacture of polyurethane foams are as follows.
(1) Polyisocyanate: carbodiimide-modified MDI (made by Nippon Polyurethane Industry Co., Ltd., trade name: "Millionate MTL")
(2) Polyol: polypropylene glycol having ethylene oxide added to a terminal (made by Mitsui Chemicals Urethanes Inc., trade name: "Actocol EP-3033", molecular weight: 6,600, content of terminal EO (ethylene oxide) units=16%, number of functional groups: 4)
(3) Chain extender: diethylene glycol
(4) Foaming agent: water
(5) Foaming catalyst: made by Air Products Japan Inc., trade name: "DABCO 33LV"
(6) Resinification catalyst: made by Adeka Corp., trade name: "Adeka Stab 465E"
(7) Foam stabilizer: silicone foam stabilizer (made by Dow Corning Toray Co., Ltd., trade name: "SH193")

<Manufacturing Method>

Of the above raw materials, Actocol EP-3033, diethylene glycol, water, DABCO 33LV, Adeka Stab 465E, and SH193 were blended at the respective blending amounts (units: g) shown in Table 1 and stirred at 6,000 rpm for 5 seconds while being temperature-adjusted to 40° C., and the liquid composition thus obtained was used as the R liquid.

To the R liquid obtained as described above and temperature-adjusted to 40° C., the P liquid, made up of Millionate MTL temperature-adjusted to 40° C., was added swiftly at each of the blending amounts (units: g) shown in Table 1, and after stirring at 6,000 rpm for 5 seconds, 55 g of the composition were injected into a closed mold (length: 10 cm, width: 10 cm, height: 1 cm) temperature-adjusted to 40° C. and the mold was then sealed and left for 10 minutes to prepare a foamed polyurethane block. The urethane block was then removed from the mold and measurements of the physical properties described below were made using polyurethane foam sheets sliced to a thickness of 1.5 mm to evaluate the characteristics of the sheets. The measurement results of the respective characteristics are shown in Table 1.

<Methods for Measuring the Respective Characteristics>

(1) Measurement of Specific Gravity

Measurements were made in accordance with a method described in JIS K 7222.

(2) Measurement of a Scale Hardness

Measurements were made using a hardness tester (made by Kobunshi Keiki Co., Ltd., trade name: "Asker Durometer Type A").

In a case where the A scale hardness was equal to or greater than 80° A, it was evaluated that the material exhibits excellent hardness as a polishing pad.

(3) Measurement of Average Pore Diameter

The pore diameters of all pores present in a photograph of a cross-section of the polyurethane foam sheet observed at a magnification of 200 times using a scanning electron microscope (made by Keyence Corp., 3D real surface view microscope, trade name: "VE-8800") were measured by analysis by an image processing apparatus, and the average value was determined as the average pore diameter.

The average pore diameter was evaluated as being suitable for a polishing pad when it was equal to or smaller than 100 μm.

(4) Measurement of 180° Flexing Property

The polyurethane foam sheet was folded in two, pressed with an index finger and a thumb until surfaces of both ends of the folded sheet contacted each other substantially, and whether or not cracks formed at the bent portion was observed visually. The size of the sample was set to: 1.5 mm thickness× 60 mm length×10 mm width.

In a case where no cracks were formed, the sample was evaluated as exhibiting an elasticity favorable for a polishing pad and given a "○" evaluation, and in a case where a crack formed, the sample was evaluated as not exhibiting an elasticity favorable for a polishing pad and given a "×" evaluation.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Polyisocyanate *1 | 45.1 | 50.1 | 55.4 | 59.7 | 65.1 | 35.3 | 40.5 | 69.7 |
| Polyol *2 | 41.2 | 34.3 | 26.9 | 20.5 | 13.4 | 54.9 | 47.7 | 6.9 |
| Chain extender *3 | 13.6 | 15.5 | 17.6 | 19.3 | 21.4 | 9.7 | 11.7 | 23.2 |
| Foaming catalyst *4 | 0.10 | 0.10 | 0.10 | 0.10 | 0.10 | 0.10 | 0.10 | 0.10 |
| Water | 0.15 | 0.15 | 0.15 | 0.15 | 0.15 | 0.15 | 0.15 | 0.15 |
| Foam stabilizer *5 | 3.00 | 3.00 | 3.00 | 3.00 | 3.00 | 3.00 | 3.00 | 3.00 |
| Resinification catalyst *6 | 0.02 | 0.02 | 0.02 | 0.02 | 0.02 | 0.02 | 0.02 | 0.02 |
| Injection amount (g) | 55 | 55 | 55 | 55 | 55 | 55 | 55 | 55 |
| Specific gravity | 0.55 | 0.55 | 0.55 | 0.55 | 0.55 | 0.55 | 0.55 | 0.55 |
| Hardness (A) | 80 | 85 | 90 | 92 | 94 | 65 | 72 | 97 |
| Average pore diameter (μm) | 60 | 60 | 70 | 70 | 80 | 60 | 60 | 100 |

TABLE 1-continued

|  | Example 1 | Example 2 | Example 3 | Example 4 | Example 5 | Comparative Example 1 | Comparative Example 2 | Comparative Example 3 |
|---|---|---|---|---|---|---|---|---|
| 180° flexing property | ○ | ○ | ○ | ○ | ○ | ○ | ○ | x |

*1: carbodiimide-modified MDI (made by Nippon Polyurethane Industry Co., Ltd., Millionate MTL)
*2: polypropylene glycol having ethylene oxide added to a terminal (made by Mitsui Chemicals Urethanes Inc., Actocol EP-3033, molecular weight: 6,600, EO content: 16%, number of functional groups: 4)
*3: diethylene glycol
*4: made by Air Products Japan Inc., DABCO 33LV
*5: made by Dow Corning Toray Co., Ltd., SH193
*6: made by Adeka Corp., Adeka Stab 465E Table 1 shows that all of Examples 1 to 5 exhibited an A scale hardness of equal to or greater than 80° A and exhibited a trend that the A scale hardness is higher the greater the blending amount of the carbodiimide-modified MDI (Millionate MTL). On the other hand, it was found that Comparative Example 1 and Comparative Example 2 exhibited an A scale hardness of less than 80° A and do not exhibit a hardness favorable for a polishing pad. From the above results, it can be said that a hardness that is excellent for a polishing pad is exhibited in the case where equal to or greater than 45 parts by weight of MDI are contained when the total weight of the respective components of MDI, polyol, and chain extender is taken as 100 parts by weight.

Next, in regard to the 180° flexing property, cracks were observed only in Comparative Example 3. From this, it can be said that an elasticity favorable for a polishing pad is not exhibited when more than 70 parts by weight of MDI are contained when the total weight of the respective components of MDI, polyol, and chain extender is taken as 100 parts by weight.

Also, in regard to the average pore diameter, all of the Examples and Comparative Examples exhibited an average pore diameter of equal to or smaller than 100 μm and were found to be suitable for a polishing pad.

2. Examination of Favorable Polyol

Examples 6 to 9 and 19 to 25 and Comparative Examples 4 to 9

Besides using the 14 types of polyols (respectively differing in molecular weight, EO content, and number of functional groups) described below and shown in Table 2 and Table 3 and blending the respective raw materials at the blending amounts (units: g) shown in Table 2 and Table 3, polyurethane foam sheets were prepared by the same manufacturing method as in "1. Examination of Favorable Blending Amount of Polyisocyanate (Examples 1 to 5 and Comparative Examples 1 to 3)" and the characteristics of the sheets were evaluated. The measurement results of the respective characteristics are shown in Table 2 and Table 3. In Table 2 and Table 3, the polyols are expressed by shortening or omitting the character portion of the (character+numeral) of the actual trade name.

<Polypropylene Glycol Having Ethylene Oxide Added to a Terminal>

(1) Trade name: "Actocol EP-3033," made by Mitsui Chemicals Urethanes Inc.
(2) Trade name: "PREMINOL 7003," made by Asahi Glass Co., Ltd.
(3) Trade name: "PREMINOL 7001," made by Asahi Glass Co., Ltd.
(4) Trade name: "Adeka Polyether AM302," made by Adeka Corp.
(5) Trade name: "PREMINOL 5005," made by Asahi Glass Co., Ltd.
(6) Trade name: "Sannix FA-702," made by Sanyo Chemical Industries, Ltd.

<Polypropylene Glycol (not Having Ethylene Oxide Added to a Terminal)>

(7) Trade name: "Adeka Polyether G3000," made by Adeka Corp.
(8) Trade name: "Actocol Diol 2000," made by Mitsui Chemicals Urethanes Inc.
(9) Trade name: "Actocol Diol 1000," made by Mitsui Chemicals Urethanes Inc.
(10) Trade name: "Adeka Polyether P-700," made by Adeka Corp.

<Random Copolymer of Polypropylene Glycol/Polyethylene Glycol>

(11) Trade name: "Actocol ED-36," made by Mitsui Chemicals Urethanes Inc.

<Polyester Polyol>

(12) Trade name: "Kurary Polyol P2010," made by Kuraray Co., Ltd.

<Ether-Based Carbonate Polyol>

(13) Trade name: "PES-EXP815," made by Nippon Polyurethane Industry Co., Ltd.

<Copolymer Polytetramethylene Ether Glycol>

(14) Trade name: "PTXG-1800," made by Asahi Kasei Corp.

TABLE 2

|  |  | EO content (%) | Molecular weight | Number of functional groups | Example 6 | Example 7 | Example 8 | Example 9 | Comparative Example 4 |
|---|---|---|---|---|---|---|---|---|---|
| Polyisocyanate *1 |  |  |  |  | 55.4 | 55.3 | 55.4 | 55.8 | 55.8 |
| Polyol | EP3033 | 16 | 6600 | 4 | 26.9 |  |  |  |  |
|  | PML-7003 | 20 | 6200 | 3 |  | 26.8 |  |  |  |
|  | PML-7001 | 8 | 6000 | 3 |  |  | 26.8 |  |  |
|  | AM302 | 20 | 3000 | 3 |  |  |  | 27.0 |  |
|  | G-3000 | 0 | 3000 | 3 |  |  |  |  | 27.0 |
|  | PML5005 | 20 | 4000 | 2 |  |  |  |  |  |

TABLE 2-continued

|  |  |  |  |  |  |  |  |  |
|---|---|---|---|---|---|---|---|---|
| Diol-2000 | 0 | 2000 | 2 |  |  |  |  |  |
| Diol-1000 | 0 | 1000 | 2 |  |  |  |  |  |
| P-700 | 0 | 700 | 2 |  |  |  |  |  |
| ED-36 | 78 | 3000 | 2 |  |  |  |  |  |
| Chain extender *2 |  | 106 | 2 | 17.5 | 17.7 | 17.7 | 17.7 | 17.7 |
| Foaming catalyst *3 |  |  |  | 0.10 | 0.10 | 0.10 | 0.10 | 0.10 |
| Water |  |  |  | 0.15 | 0.15 | 0.15 | 0.15 | 0.15 |
| Foam stabilizer *4 |  |  |  | 3.00 | 3.00 | 3.00 | 3.00 | 3.00 |
| Resinification catalyst *5 |  |  |  | 0.02 | 0.02 | 0.02 | 0.02 | 0.02 |
| Injection amount (g) |  |  |  | 55 | 55 | 55 | 55 | 55 |
| Specific gravity |  |  |  | 0.55 | 0.55 | 0.55 | 0.55 | 0.55 |
| Hardness (A) |  |  |  | 90 | 90 | 90 | 90 | 85 |
| Average pore diameter (μm) |  |  |  | 70 | 70 | 70 | 70 | 80 |
| 180° flexing property |  |  |  | ○ | ○ | ○ | ○ | x |

|  |  | Comparative Example 5 | Comparative Example 6 | Comparative Example 7 | Comparative Example 8 | Comparative Example 9 |
|---|---|---|---|---|---|---|
| Polyisocyanate *1 |  | 55.4 | 55.1 | 54.4 | 55.2 | 55.1 |
| Polyol | EP3033 |  |  |  |  |  |
|  | PML-7003 |  |  |  |  |  |
|  | PML-7001 |  |  |  |  |  |
|  | AM302 |  |  |  |  |  |
|  | G-3000 |  |  |  |  |  |
|  | PML5005 | 26.8 |  |  |  |  |
|  | Diol-2000 |  | 27.9 |  |  |  |
|  | Diol-1000 |  |  | 30.7 |  |  |
|  | P-700 |  |  |  | 31.1 |  |
|  | ED-36 |  |  |  |  | 27.0 |
| Chain extender *2 |  | 17.7 | 16.8 | 14.8 | 13.6 | 17.7 |
| Foaming catalyst *3 |  | 0.10 | 0.10 | 0.10 | 0.10 | 0.10 |
| Water |  | 0.15 | 0.15 | 0.15 | 0.15 | 0.15 |
| Foam stabilizer *4 |  | 3.00 | 3.00 | 3.00 | 3.00 | 3.00 |
| Resinification catalyst *5 |  | 0.02 | 0.02 | 0.02 | 0.02 | 0.01 |
| Injection amount (g) |  | 55 | 55 | 55 | 55 | 55 |
| Specific gravity |  | 0.55 | 0.55 | 0.55 | 0.55 | 0.55 |
| Hardness (A) |  | 86 | 88 | 85 | 84 | 88 |
| Average pore diameter (μm) |  | 70 | 70 | 100 | 100 | 120 |
| 180° flexing property |  | x | x | x | x | x |

*1: carbodiimide-modified MDI (made by Nippon Polyurethane Industry Co., Ltd., Millionate MTL)
*2: diethylene glycol
*3: made by Air Products Japan Inc., DABCO 33LV
*4: made by Dow Corning Toray Co., Ltd., SH193
*5: made by Adeka Corp., Adeka Stab 465E

TABLE 3

|  |  | EO content (%) | Molecular weight | Number of functional groups | Example 19 | Example 20 | Example 21 | Example 22 | Example 23 | Example 24 | Example 25 |
|---|---|---|---|---|---|---|---|---|---|---|---|
| Polyisocyanate *1 |  |  |  |  | 55.5 | 55.8 | 56.3 | 55.8 | 55.6 | 54.4 | 55.4 |
| Polyol | PML-7003 | 20 | 6200 | 3 |  |  |  |  |  |  | 23.7 |
|  | FA-702 | 12 | 5800 | 4 | 26.9 |  |  |  | 18.6 |  | 25.5 |
|  | P2010 | 0 | 2000 | 2 |  | 27.0 |  |  |  |  |  |
|  | PTXG-1800 | 0 | 1800 | 2 |  |  | 27.3 |  |  |  |  |
|  | PES-EXP815 | 0 | 2000 | 2 |  |  |  | 26.0 |  |  |  |
|  | Diol-2000 | 0 | 2000 | 2 |  |  |  |  | 8.3 |  |  |
|  | Diol-1000 | 0 | 1000 | 2 |  |  |  |  |  | 3.2 |  |
| Chain extender | Diethylene glycol |  | 106 | 2 | 17.5 | 17.1 | 16.3 | 17.1 | 17.4 | 17.5 | 17.4 |
|  | T-400 *2 | 0 | 400 | 3 |  |  |  |  |  |  | 1.5 |
| Foaming catalyst *3 |  |  |  |  | 0.10 | 0.10 | 0.10 | 0.10 | 0.10 | 0.10 | 0.10 |
| Water |  |  |  |  | 0.15 | 0.15 | 0.15 | 0.15 | 0.15 | 0.15 | 0.15 |
| Foam stabilizer *4 |  |  |  |  | 3.00 | 3.00 | 3.00 | 3.00 | 3.00 | 3.00 | 3.00 |
| Resinification catalyst *5 |  |  |  |  | 0.02 | 0.02 | 0.02 | 0.02 | 0.02 | 0.02 | 0.02 |
| Injection amount (g) |  |  |  |  | 55 | 55 | 55 | 55 | 55 | 55 | 55 |
| Specific gravity |  |  |  |  | 0.55 | 0.53 | 0.56 | 0.53 | 0.55 | 0.55 | 0.53 |
| Hardness (A) |  |  |  |  | 92 | 92 | 93 | 92 | 91 | 90 | 90 |

TABLE 3-continued

| | EO content (%) | Molecular weight | Number of functional groups | Example 19 | Example 20 | Example 21 | Example 22 | Example 23 | Example 24 | Example 25 |
|---|---|---|---|---|---|---|---|---|---|---|
| Average pore diameter (μm) | | | | 70 | 70 | 70 | 70 | 95 | 70 | 85 |
| 180° flexing property | | | | ◯ | ◯ | ◯ | ◯ | ◯ | ◯ | ◯ |

*1: carbodiimide-modified MDI (made by Nippon Polyurethane Industry Co., Ltd., Millionate MTL)
*2: trimethylolpropane/polypropylene glycol copolymer (made by Adeka Corp., Adeka Polyether T-400)
*3: made by Air Products Japan Inc., DABCO 33LV
*4: made by Dow Corning Toray Co., Ltd., SH193
*5: made by Adeka Corp., Adeka Stab 465E As shown in Table 2 and Table 3, the A scale hardness was equal to or greater than 80° A for all of Examples 6 to 9 and 19 to 25 and Comparative Examples 4 to 9. On the other hand, in regard to the 180° flexing property, whereas no cracks were observed with Examples 6 to 9 and 19 to 25, cracks were observed with Comparative Examples 4 to 9.

In Comparative Examples 4 and 6 to 8, only a propylene glycol not having ethylene oxide added to a terminal was used as the polyol, in Comparative Example 5, a polypropylene glycol with an average number of functional groups of 2 and having ethylene oxide added to a terminal was used as the polyol, and in Comparative Example 9, a random copolymer of polypropylene glycol/polyethylene glycol with an average number of functional groups of 2 was used as the polyol, and it was found that in cases where such polypropylene glycols are used as the main component of the polyol, an elasticity favorable for a polishing pad is not exhibited when the one-shot method, applied as the manufacturing method for the present test examples, is applied.

Also, from the results of Examples 23 and 24, it was found that when a polypropylene glycol having ethylene oxide added to a terminal is used as a main component and a small amount of a polypropylene glycol used in Comparative Examples 4 to 9 is blended in the polyol, the A scale hardness and the 180° flexing property are not affected adversely even when the one-shot method is applied.

From the above results, it can be said that in order to make an elasticity favorable for a polishing pad to be exhibited in the present test examples, it is preferable to make a polypropylene glycol having a number average molecular weight of equal to or greater than 2500, having an average number of functional groups of equal to or greater than 3, and having ethylene oxide added to a terminal, or a polyester polyol, a polycarbonate polyol, or a polytetramethylene ether glycol be a main component of the polyol.

3. Examination of Favorable Chain Extender

Examples 3, 10, 11, and 26 and Comparative Example 10

Besides using the four types of chain extender shown in Table 4 and blending the respective raw materials at the blending amounts (units: g) shown in Table 4, polyurethane foam sheets were prepared by the same manufacturing method as in "1. Examination of Favorable Blending Amount of Polyisocyanate (Examples 1 to 5 and Comparative Examples 1 to 3)" and the characteristics of the sheets were evaluated. The measurement results of the respective characteristics are shown in Table 4.

TABLE 4

| | | EO content (%) | Molecular weight | Number of functional groups | Example 3 | Example 10 | Example 11 | Example 26 | Comparative Example 10 |
|---|---|---|---|---|---|---|---|---|---|
| Polyisocyanate *1 | | | | | 55.4 | 55.6 | 55.5 | 55.6 | 55.5 |
| Polyol *2 | | 16 | 6200 | 4 | 26.9 | 30.4 | 34.2 | 34.2 | 29.5 |
| Chain extender | Diethylene glycol | | 106 | 2 | 17.6 | 8.8 | | | |
| | Ethylene glycol | | 62 | 2 | | 7.9 | 10.1 | | |
| | 1,4-butanediol | | 90 | 2 | | | | | 14.8 |
| | 1,3-propanediol | | 76 | 2 | | | | 12.5 | |
| Foaming catalyst *3 | | | | | 0.10 | 0.10 | 0.10 | 0.10 | 0.10 |
| Water | | | | | 0.15 | 0.15 | 0.15 | 0.15 | 0.15 |
| Foam stabilizer *4 | | | | | 3.00 | 3.00 | 3.00 | 3.00 | 3.00 |
| Resinification catalyst *5 | | | | | 0.02 | 0.02 | 0.02 | 0.02 | 0.02 |
| Injection amount (g) | | | | | 55 | 55 | 55 | 55 | 55 |
| Specific gravity | | | | | 0.55 | 0.55 | 0.55 | 0.55 | 0.55 |
| Hardness (A) | | | | | 90 | 90 | 90 | 91 | 88 |
| Average pore diameter (μm) | | | | | 70 | 80 | 90 | 80 | 130 |
| 180° flexing property | | | | | ◯ | ◯ | ◯ | ◯ | ◯ |

*1: carbodiimide-modified MDI (made by Nippon Polyurethane Industry Co., Ltd., Millionate MTL)
*2: polypropylene glycol having ethylene oxide added to a terminal (made by Mitsui Chemicals Urethanes Inc., Actocol EP-3033, molecular weight: 6,600, EO content = 16%, number of functional groups: 4)
*3: made by Air Products Japan Inc., DABCO 33LV
*4: made by Dow Corning Toray Co., Ltd., SH193
*5: made by Adeka Corp., Adeka Stab 465E As shown in Table 4, with all of Examples 3, 10, 11, and 26 and Comparative Example 10, the A scale hardness was equal to or greater than 80° A and satisfactory results were obtained for the 180° flexing property. Also, whereas the average pore diameter was less than 100 μm with Examples 3, 10, 11, and 26, in which diethylene glycol, ethylene glycol, or 1,3-propanediol was used as the chain extender, the average pore diameter was 130 μm with Comparative Example 10, in which 1,4-butanediol was used as the chain extender. From these results, it was found that when diethylene glycol, ethylene glycol, or 1,3-propanediol is used as the chain extender, the average pore diameter is made minute and more suitable for a polishing pad.

4. Examination of Adjustment of Specific Gravity

Examples 4 and 12 to 16 and Comparative Example 11

Besides setting the injection amounts into the closed mold to the amounts shown in Table 5 and additionally performing the abrasion test described below, polyurethane foam sheets were prepared by the same manufacturing method as in "1. Examination of Favorable Blending Amount of Polyisocyanate (Examples 1 to 5 and Comparative Examples 1 to 3)" and the characteristics of the sheets were evaluated. The measurement results of the respective characteristics are shown in Table 5.

With the present examples, viscosities of the R liquid and the P liquid at 40° C. were measured using a BH viscometer (made by Toki Sangyo Co., Ltd.), and that of the R liquid was 860 mPa·s and that of the P liquid was 18 mPa·s.

With Comparative Example 11, a polyurethane foam was trial manufactured in accordance with Example 1 of Japanese Published Unexamined Patent Application No. 2000-178374 and sliced to a thickness of 1.5 mm to prepare the test sample.

<Abrasion Test Method>

The abrasion test was performed using a taper abrasion tester (made by Yasuda Seiki Seisakusho Ltd.) and in compliance to JIS K 7204. Specifically, an abrasion amount (indicated as "taper abrasion" (units: g) in Table 5) when 1000 rotations were performed at a rotation speed of 60 rpm with a load of 1500 g and using H18 as an abrasive wheel was measured and evaluated.

TABLE 5

|  | Example 12 | Example 13 | Example 14 | Example 4 | Example 15 | Example 16 | Comparative Example 11 |
|---|---|---|---|---|---|---|---|
| Polyisocyanate *1 | 59.7 | 59.7 | 59.7 | 59.7 | 59.7 | 59.7 | |
| Polyol *2 | 20.5 | 20.5 | 20.5 | 20.5 | 20.5 | 20.5 | |
| Chain extender *3 | 19.3 | 19.3 | 19.3 | 19.3 | 19.3 | 19.3 | |
| Foaming catalyst *4 | 0.10 | 0.10 | 0.10 | 0.10 | 0.10 | 0.10 | |
| Water | 0.15 | 0.15 | 0.15 | 0.15 | 0.15 | 0.15 | |
| Foam stabilizer *5 | 3.00 | 3.00 | 3.00 | 3.00 | 3.00 | 3.00 | |
| Resinification catalyst *6 | 0.02 | 0.02 | 0.02 | 0.02 | 0.02 | 0.02 | |
| Injection amount (g) | 22 | 33 | 44 | 55 | 65 | 75 | |
| Specific gravity | 0.21 | 0.33 | 0.45 | 0.55 | 0.66 | 0.76 | |
| Cl content (%) | 0 | 0 | 0 | 0 | 0 | 0 | 7.9 |
| Hardness (A) | 80 | 86 | 90 | 92 | 94 | 96 | 96 |
| Average pore diameter (μm) | 100 | 90 | 80 | 70 | 70 | 70 | |
| 180° flexing property | ○ | ○ | ○ | ○ | ○ | ○ | ○ |
| Taper abrasion (g) | 0.33 | 0.29 | 0.24 | 0.2 | 0.17 | 0.18 | 0.17 |

*1: carbodiimide-modified MDI (made by Nippon Polyurethane Industry Co., Ltd., Millionate MTL)
*2: polypropylene glycol having ethylene oxide added to a terminal (made by Mitsui Chemicals Urethanes Inc., Actocol EP-3033, molecular weight: 6,600, EO content: 16%, number of functional groups: 4)
*3: diethylene glycol
*4: made by Air Products Japan Inc., DABCO 33LV
*5: made by Dow Corning Toray Co., Ltd., SH193
*6: made by Adeka Corp., Adeka Stab 465E From Table 5, it was found that the injection amount of the blend composition and the specific gravity of the test sample are in a proportional relationship. Here, Examples 4 and 12 to 16 (by the present invention) had specific gravities of 0.21 to 0.76 and yet all exhibited an A scale hardness of equal to or greater than 80° A within this range. It was thus found that the examples by the present invention have a hardness favorable for a polishing pad despite being low in specific gravity. Also, from the taper abrasion results of Examples 4 and 12 to 16 and Comparative Example 11, it was confirmed that the examples by the present invention have an abrasion resistance equivalent to that of the conventional product (Comparative Example 11).

5. Characteristics of Polyurethane Foam Sheet Manufactured Using Another MDI in Combination Examples 3 and 17

Besides using the two types of polyisocyanate described below and in Table 6 and blending the respective raw materials at the blending amounts (units: g) shown in Table 6, polyurethane foam sheets were prepared by the same manufacturing method as in "1. Examination of Favorable Blending Amount of Polyisocyanate (Examples 1 to 5 and Comparative Examples 1 to 3)" and the characteristics of the sheets were evaluated. The measurement results of the respective characteristics are shown in Table 6.

<MDI>

(1) Carbodiimide-modified MDI (made by Nippon Polyurethane Industry Co., Ltd., trade name: "Millionate MTL")

(2) Pure MDI (made by Nippon Polyurethane Industry Co., Ltd., trade name: "Millionate MT")

TABLE 6

|  |  | Example 3 | Example 17 |
|---|---|---|---|
| Polyisocyanate | Carbodiimide-modified MDI *1a | 55.4 | 27.6 |
|  | Pure MDI *1b |  | 27.6 |
| Polyol *2 |  | 26.9 | 25.6 |
| Chain extender *3 |  | 17.6 | 19.1 |
| Foaming catalyst *4 |  | 0.10 | 0.10 |
| Water |  | 0.15 | 0.15 |
| Foam stabilizer *5 |  | 3.00 | 3.00 |
| Resinification catalyst *6 |  | 0.02 | 0.02 |
| Injection amount (g) |  | 55 | 55 |
| Specific gravity |  | 0.55 | 0.55 |
| Hardness (A) |  | 90 | 90 |
| Average pore diameter (μm) |  | 70 | 90 |
| 180° flexing property |  | ○ | ○ |

*1a: made by Nippon Polyurethane Industry Co., Ltd., Millionate MTL
*1b: made by Nippon Polyurethane Industry Co., Ltd., Millionate MT
*2: polypropylene glycol having ethylene oxide added to a terminal (made by Mitsui Chemicals Urethanes Inc., Actocol EP-3033, molecular weight: 6,600, EO content: 16%, number of functional groups: 4)
*3: diethylene glycol
*4: made by Air Products Japan Inc., DABCO 33LV
*5: made by Dow Corning Toray Co., Ltd., SH193
*6: made by Adeka Corp., Adeka Stab 465E From Table 6, it was found that even in a case where a carbodiimide-modified MDI and pure MDI are used in combination (Example 7), hardness, elasticity, and average pore diameter equivalent to the case of using just the carbodiimide-modified MDI (Example 3) are exhibited.

6. Characteristics of Foam Sheet Manufactured Using a RIM Machine

Examples 3 and 18

With a blend composition of the same composition as Example 3 of Table 1, a foamed polyurethane block was prepared using a RIM machine, and using a polyurethane foam sheet obtained by slicing the urethane block to a thickness of 1.5 mm as the test sample, the same physical properties as those described above were measured to evaluate the characteristics of the sheet (Example 18).

Specifically, Actocol EP-3033, diethylene glycol, water, DABCO 33LV, Adeka Stab 465E, and SH193 were blended at the respective blending amounts (units: g) shown in Table 6 and stirred at 6,000 rpm for 5 seconds while being temperature-adjusted to 40° C., and the liquid composition thus obtained was used as the R liquid.

The P liquid, made up of Millionate MTL obtained as described above and temperature-adjusted to 40° C., was then prepared.

The entire amount of the R liquid and 55.4 g of the P liquid were then collision mixed at a discharge pressure of 14 MPa by the RIM machine, thereafter discharged at a discharge amount of 1,000 g (discharge speed: 250 g/sec) into a closed mold of 30 cm length, 30 cm width, and 2 cm height, which was temperature-adjusted to 40° C., and then left for 10 minutes to prepare the foamed polyurethane block.

The urethane block was then removed from the mold and measurements of the physical properties shown below were made using the polyurethane foam sheet sliced to a thickness of 1.5 mm to evaluate the characteristics of the sheet. The measurement results of the respective characteristics are shown in Table 7.

TABLE 7

|  | Example 3 | Example 18 | Example 27 |
|---|---|---|---|
| Polyisocyanate *1 | 55.4 | 55.4 | 55.4 |
| Polyol *2 | 26.9 | 26.9 | 26.9 |
| Chain extender *3 | 17.6 | 17.6 | 17.6 |
| Foaming catalyst *4 | 0.10 | 0.10 | 0.10 |
| Water | 0.15 | 0.15 | 0.15 |
| Foam stabilizer *5 | 3.00 | 3.00 | 3.00 |
| Resinification catalyst *6 | 0.02 | 0.02 | 0.02 |
| Injection amount (g) | 55 | 1,000 | 55 |
| Specific gravity | 0.55 | 0.55 | 0.55 |
| Hardness (A) | 90 | 92 | 90 |
| Average pore diameter (μm) | 70 | 35 | 70 |
| 180° flexing property | ○ | ○ | ○ |

*1: carbodiimide-modified MDI (made by Nippon Polyurethane Industry Co., Ltd., Millionate MTL)
*2: polypropylene glycol having ethylene oxide added to a terminal (made by Mitsui Chemicals Urethanes Inc., Actocol EP-3033, molecular weight: 6,600, EO content: 16%, number of functional groups: 4)
*3: diethylene glycol
*4: made by Air Products Japan Inc., DABCO 33LV
*5: made by Dow Corning Toray Co., Ltd., SH193
*6: made by Adeka Corp., Adeka Stab 465E From Table 7 and FIG. 1 and FIG. 2, it was found that when manufacture is performed using the RIM machine, the average pore diameter of the test piece is made minute and more suitable for a polishing pad.

7. Characteristics of Polyurethane Foam Sheet Manufactured by the Prepolymer Method 1

Examples 3 and 27

With a blend composition of the same composition as Example 3 of Table 1, a foamed polyurethane block was prepared adopting the prepolymer method, and using a polyurethane foam sheet obtained by slicing the urethane block to a thickness of 1.5 mm as the test sample, the same physical properties as those described above were measured to evaluate the characteristics of the sheet (Example 27).

Specifically, respective blending amounts of Actocol EP-3033 and Millionate MTL shown in Table 7 (units: g) were reacted and prepolymerized at 80° C. for 2 hours under nitrogen gas seal, and the liquid prepolymer thus obtained was used as the X liquid. Diethylene glycol, water, DABCO 33LV, Adeka Stab 465E, and SH193 were then blended at the respective blending amounts (units: g) shown in Table 7 and stirred at 6,000 rpm for 5 seconds while being temperature-adjusted to 40° C., the liquid composition thus obtained was used as the Y liquid and added swiftly at the blending amount (units: g) shown in Table 7 to the X liquid, and after stirring at 6,000 rpm for 5 seconds, 55 g of the composition were injected into a closed mold (length: 10 cm, width: 10 cm, height: 1 cm) temperature-adjusted to 40° C. and the mold was then sealed and left for 10 minutes to prepare a foamed polyurethane block. The urethane block was then placed in an oven, maintained at 100° C. for 10 hours, and thereafter the urethane block obtained was removed from the mold and measurements of the physical properties shown below were made using a polyurethane foam sheet sliced to a thickness of 1.5 mm as a test piece to evaluate the characteristics of the sheet. The measurement results of the respective characteristics are shown in Table 7.

From Table 7, it was found that even when manufacturing is performed by the prepolymer method (Example 27), the same characteristics are obtained as in the case of manufacture by the one-shot method (Example 3).

8. Characteristics of Polyurethane Foam Sheet Manufactured by the Prepolymer Method 2

Example 28 and Comparative Examples 4, 7, and 12

Besides using blend compositions of the same compositions as Comparative Examples 4 and 7 of Table 2, polyurethane foam sheets were prepared by the same manufacturing method as in "7. Characteristics of Polyurethane Foam Sheet Manufactured by the Prepolymer Method 1 (Examples 3 and 27)" and the characteristics of the sheets were evaluated (Example 28 and Comparative Example 12). The measurement results of the respective characteristics are shown in Table 8.

TABLE 8

|  | EO content (%) | Molecular weight | Number of functional groups | Example 28 | Comparative Example 12 | Comparative Example 4 | Comparative Example 7 |
|---|---|---|---|---|---|---|---|
| Polyisocyanate *1 |  |  |  | 55.8 | 54.4 | 55.8 | 54.4 |
| Polyol   G-3000 | 0 | 3000 | 3 | 27.0 |  | 27.0 |  |
|           Diol-1000 | 0 | 1000 | 2 |  | 30.7 |  | 30.7 |
| Chain extender *2 |  | 106 | 2 | 17.7 | 14.8 | 17.7 | 14.8 |
| Foaming catalyst *3 |  |  |  | 0.10 | 0.10 | 0.10 | 0.10 |
| Water |  |  |  | 0.15 | 0.15 | 0.15 | 0.15 |
| Foam stabilizer *4 |  |  |  | 3.00 | 3.00 | 3.00 | 3.00 |
| Resinification catalyst *5 |  |  |  | 0.02 | 0.02 | 0.02 | 0.02 |
| Injection amount (g) |  |  |  | 55 | 55 | 55 | 55 |
| Specific gravity |  |  |  | 0.55 | 0.55 | 0.55 | 0.55 |
| Hardness (A) |  |  |  | 85 | 85 | 85 | 85 |
| Average pore diameter (μm) |  |  |  | 70 | 100 | 80 | 100 |
| 180° flexing property |  |  |  | ○ | x | x | x |

*1: carbodiimide-modified MDI (made by Nippon Polyurethane Industry Co., Ltd., Millionate MTL)
*2: diethylene glycol
*3: made by Air Products Japan Inc., DABCO 33LV
*4: made by Dow Corning Toray Co., Ltd., SH193
*5: made by Adeka Corp., Adeka Stab 465E As shown in Table 8, although as with Comparative Example 7, a satisfactory result was not obtained in regard to the 180° flexing property with Comparative Example 12, a satisfactory result was obtained in regard to the 180° flexing property with Example 28.

Example 28 and Comparative Example 12 both use a polypropylene glycol not having ethylene oxide added to a terminal as the polyol but these differ in number average molecular weight and average number of functional groups.

From these results, it is considered that a polyurethane foam sheet having the hardness and the elasticity favorable for a polishing pad can be manufactured by adopting the prepolymer method when a polypropylene glycol, having a number average molecular weight of equal to or greater than 2500, having an average number of functional groups of equal to or greater than 3, and not having ethylene oxide added to a terminal, is used as the main component of the polyol.

INDUSTRIAL APPLICABILITY

The present invention can be used widely as a polyurethane foam, a method for manufacturing the foam, and a polishing pad made of the foam. Also, besides a polishing pad, the polyurethane foam is also applicable, for example, to shock absorbers (artificial sleepers, vibration-proofing materials, shock absorbers for automobiles, etc.), yarn feeding roll materials for spinning, lining materials (for steel pipes, for screens meshes, etc.), industrial rolls (rolls for office automation equipment, caster wheels, rolls for various construction materials, etc.), etc.

What is claimed is:

1. A polishing pad made of a polyurethane foam obtained by reacting a blend composition consisting of (A) a polyisocyanate, (B) a polyol, (C) a polyvalent alcohol-based chain extender with a molecular weight of equal to or smaller than 400, and (D) water, and optionally one or more additives, wherein in the blend composition, component (A), the polyisocyanate, consists of diphenylmethane diisocyanate (MDI) and the MDI is 45 to 70 parts by weight when a total weight of components (A), (B), and (C) is taken as 100 parts by weight, and wherein component (B), the polyol, consists of a first polypropylene glycol having a number average molecular weight of equal to or greater than 2500, having an average number of functional groups of equal to or greater than 3 and having ethylene oxide added to a terminal, or component (B), the polyol, consists of said first polypropylene glycol and a second polypropylene glycol having no ethylene oxide added to a terminal.

2. The polishing pad made according to claim 1, wherein at least one type of chain extender selected from the group consisting of diethylene glycol, ethylene glycol, and 1,3-propanediol is included in the component (C).

3. A method of manufacturing the polishing pad according to claim 1, wherein, in reacting the blend composition inside a closed mold, 10 to 80 parts by weight of the blend composition are injected per 100 parts by volume of the closed mold.

* * * * *